UNITED STATES PATENT OFFICE.

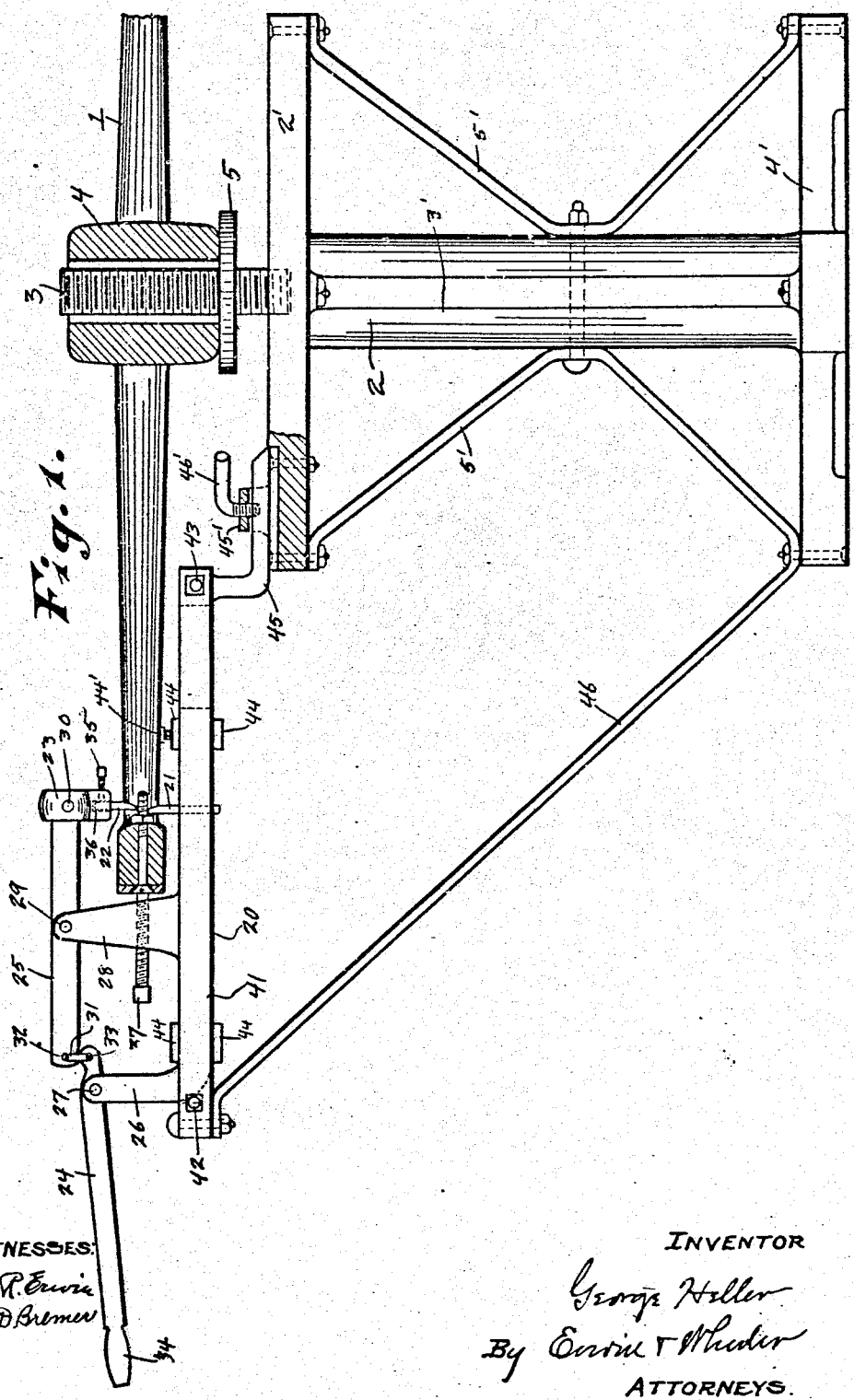
G. HELLER.
TIRE BOLT CUTTER AND NUT TURNER AND SPLITTER.
APPLICATION FILED MAR. 1, 1909.
971,195.  Patented Sept. 27, 1910.
3 SHEETS—SHEET 1.

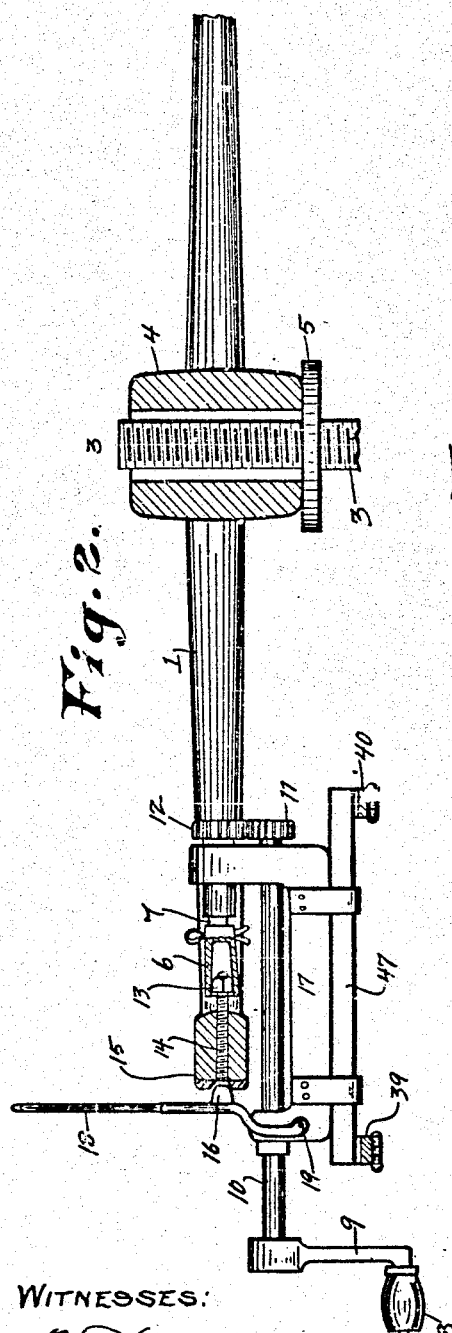
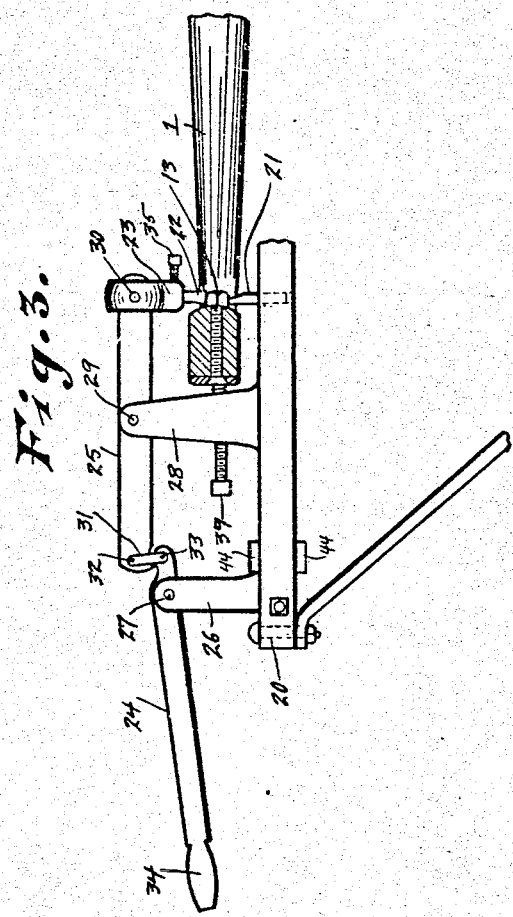

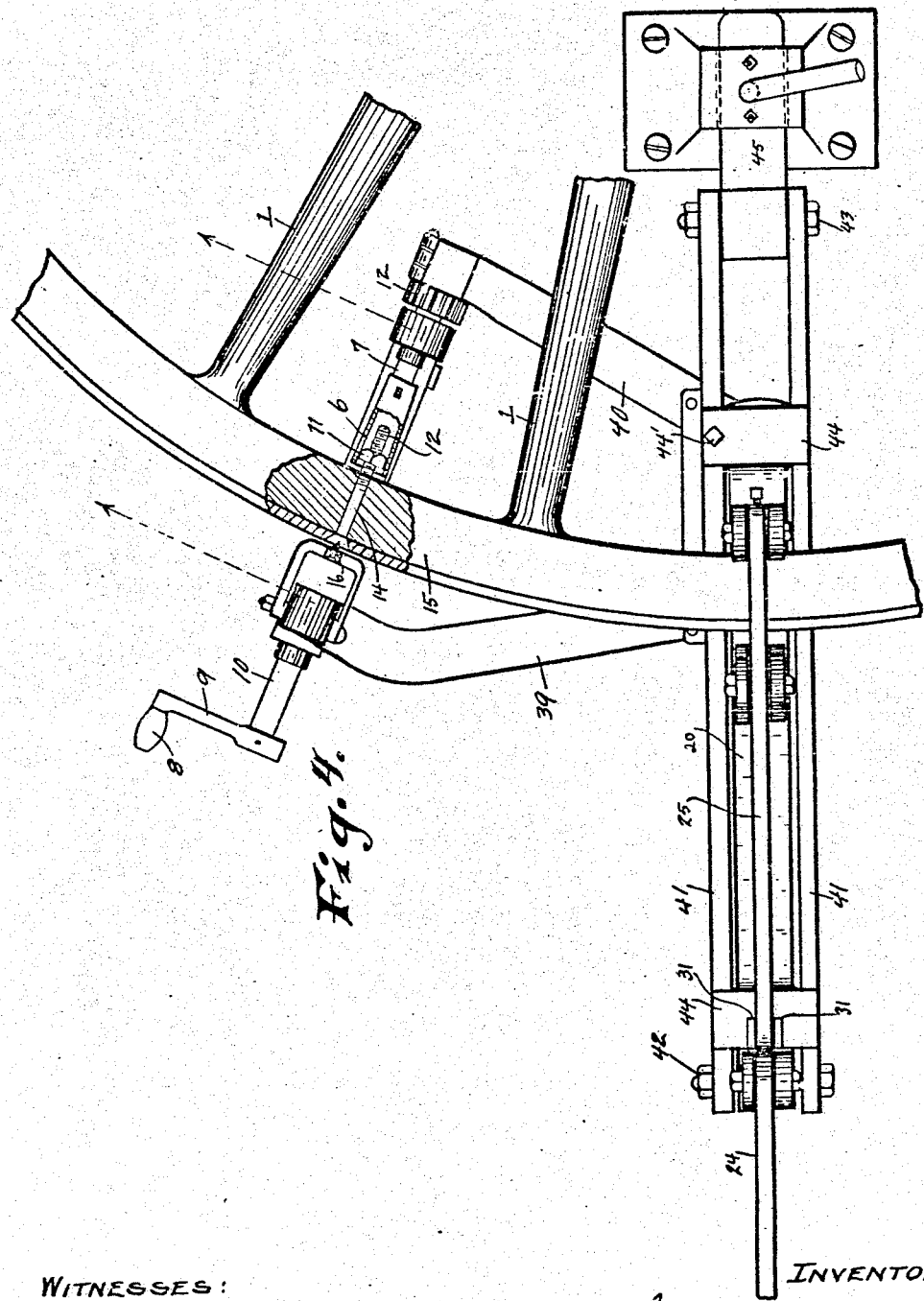

GEORGE HELLER, OF MILWAUKEE, WISCONSIN.

TIRE-BOLT CUTTER AND NUT TURNER AND SPLITTER.

971,195. Specification of Letters Patent. Patented Sept. 27, 1910.

Application filed March 1, 1909. Serial No. 480,581.

*To all whom it may concern:*

Be it known that I, GEORGE HELLER, a citizen of the United States, residing at Milwaukee, county of Milwaukee, and State of Wisconsin, have invented new and useful Improvements in Tire-Bolt Cutters and Nut Turners and Splitters, of which the following is a specification.

My invention relates to improvements in machines for turning the nuts upon and removing them from the tire retaining bolts of wheels and to the device combined therewith for splitting the nuts when rusted upon the bolts, or which for any other reason are difficult to remove and for cutting off the ends of the bolts flush with the inner face of the nuts after the latter have been turned down against the felly of the wheel, and my improvements pertain more especially to the device by which the nut turning mechanism and bolt cutting tools are adapted to be simultaneously adjusted together to fit wheels of a given diameter, whereby when the nuts upon any given bolt have been turned down, the same bolt may be brought into alinement with the cutting tools by turning the wheel a partial revolution upon its supporting base.

My invention is further explained by reference to the accompanying drawings, in which—

Figure 1 represents a side view of that part of the device which is used for severing the ends of the tire retaining bolts. Fig. 2 also represents a side view of the upper portion of that part of the machine which is used for tightening the nuts upon or removing them from the tire retaining bolts. Fig. 3 represents a side view of the bolt cutting device provided with the nut splitting tools in position for splitting a nut; and Fig. 4 is a plan view of a portion of the machine showing the relative position of the bolt cutting and nut tightening mechanism in connection with a wheel and the mechanism by which such parts are simultaneously adjusted to be operated on wheels of different diameters.

Like parts are identified by the same reference figures throughout the several views.

1 represents a portion of an ordinary wagon wheel, which is centrally supported upon a substantial bench 2.

3 is a screw threaded wheel supporting shaft, which is rigidly affixed at its lower end to the bench, while its upper end is inserted through the central aperture of the hub 4 of the wheel, around which shaft the wheel is adapted to turn.

5 is a screw threaded wheel-supporting plate, upon which the lower side of the hub is adapted to rest as the wheel is being operated upon and by which the wheel is adjusted vertically as may be required to bring the tire retaining bolts to the proper position to be operated upon.

6 is a wrench, which is revolubly supported from the shaft 7. Motion is communicated to the wrench 6 from the operating handle 8 through the crank 9, shaft 10, gear wheels 11 and 12 and wrench supporting shaft 7, whereby the nut 13 may be turned both down upon or removed from the tire retaining bolt 14 by turning the handle 8. The bolt 14 is prevented from turning in the felly 15 as the nut is turned thereon by the blade 16 which is inserted in the groove of the bolt head. The blade 16 is rigidly affixed to the lever 18, which lever is pivotally supported from the frame 17 by the pin 19, whereby as the operator turns the handle 8 with one hand, he can prevent the bolt from turning by pressing the other hand against the lever 18.

The bolt and nut cutting device comprise the slidable base 20, stationary cutting tool 21, movable cutting tool 22, tool supporting head 23, and levers 24 and 25. The lever 24 is pivotally supported from the base 20 upon the vertical standard 26, by the pivotal bolt 27, while the lever 25 is pivotally connected with said base by the standard 28 and pivotal bolt 29, and the head 23 is connected with the lever 25 by the pivotal bolt 30. The opposing ends of the levers 24 and 25 are pivotally connected together by the links 31 and link retaining bolts 32 and 33, whereby as the operator presses downwardly on the handle 34, the cutting tool 22 will be forced by the combined movement of said levers against the nut or bolt, whereby the same will be split or severed.

It will be understood that when it is desired to cut the bolt at the side of the nut, the tool 22 is withdrawn from the head and moved one-quarter of a turn in its bearings, whereby the blade is brought at right angles to the position shown in Fig. 3, and the bolt will be severed by the same movement of the levers that is required for splitting the nut. 35 is a set screw by which the cutting tool 22 is retained in the head, the head 23 being provided with a socket 36 for the reception of the head of the cutting tool and the set screw 35 has threaded bearings in said head at right angles to said socket, whereby as the set screw is turned forward, it is caused to impinge against the head of the cutting tool and thereby secure the same in place. 37 is an adjustable bolt, which has screw threaded bearings in the standard 28 and is adapted to be turned forward in such bearings against the head of the tire retaining bolt, whereby the same is retained in place as the bolt or nut is being severed. The nut turning mechanism and nut cutting mechanism are rigidly connected together by the connecting bars 39 and 40, whereby both of said devices are simultaneously adjusted in relation to the wheel to fit wheels of different diameters by adjusting the bolt and nut cutting base. The base 20 comprises the two side plates 41, 41, which are rigidly connected together at one end by the bolt 42 and at their opposite end by the bolt 43 and the base 20 is adjustably connected with said side plates by the horizontal brackets 44 and set screw 44', while the side plates 41 are rigidly connected with the wheel supporting bench 2 by the bracket 45 sleeve 45', hand screw 46' and brace member 46, whereby it will be obvious that by loosening the set screw 44', said base member 20 may be adjusted nearer to or farther from the center of the bench 2, and whereby the tools connected with said adjustable base may be adjusted to conform to wheels of different diameters. It will be understood that the adjustable base 20 of the cutting tools is connected with the base 47, upon which the nut turning device is supported by said horizontal members 39 and 40, whereby the movable bases 20 and 47, and the parts connected therewith are simultaneously adjusted as previously described. The bench 2 comprises the top member 2', central standard 3', base member 4', and brace members 5', 5', all of which parts are rigidly connected together, substantially as shown in Fig. 1.

Having thus described my invention, what I claim as new, and desire to secure by Letters Patent, is—

In a device of the described class, the combination of a bench for revolubly supporting a vehicle wheel, a vertical shaft centrally supported from said bench, means for adjustably supporting said wheel on said shaft, a pair of compound levers, cutting tools connected with said levers for both splitting the nuts and cutting the tire retaining bolts of said wheel, a crank operative device for turning the nuts on said bolts, said bolt cutting and bolt turning tools being adapted to be adjusted to conform to vehicle wheels of different diameters.

In testimony whereof I affix my signature in the presence of two witnesses.

GEORGE HELLER.

Witnesses:
O. R. ERWIN,
JAS. B. ERWIN.